Oct. 19, 1965 E. GOLDSTEIN ETAL 3,212,501
URINE DRIP ABSORBING APPARATUS
Filed April 22, 1963 4 Sheets-Sheet 1

INVENTORS
EUGENE GOLDSTEIN
WILLIAM V. MATHENY
BY
Alfred R. Fuchs
ATTORNEY

INVENTORS
EUGENE GOLDSTEIN
WILLIAM V. MATHENY
BY Alfred R. Fuchs
ATTORNEY

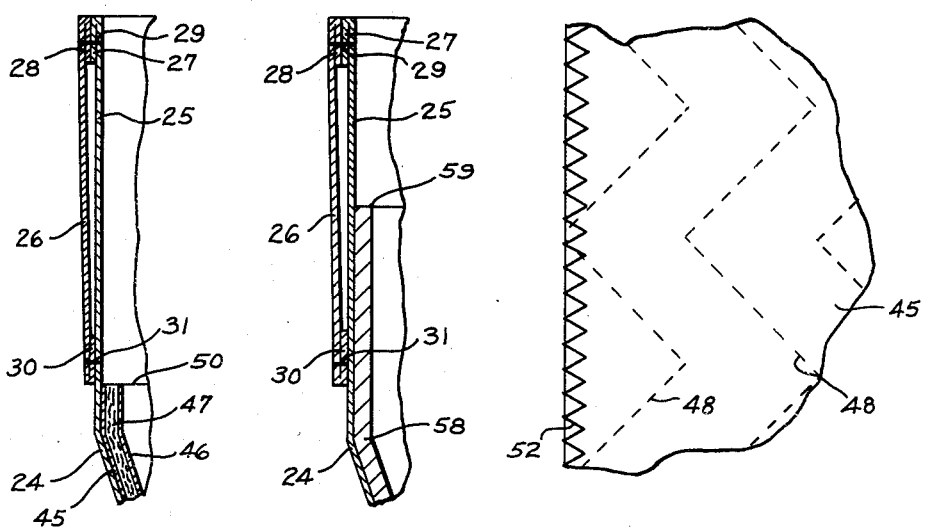
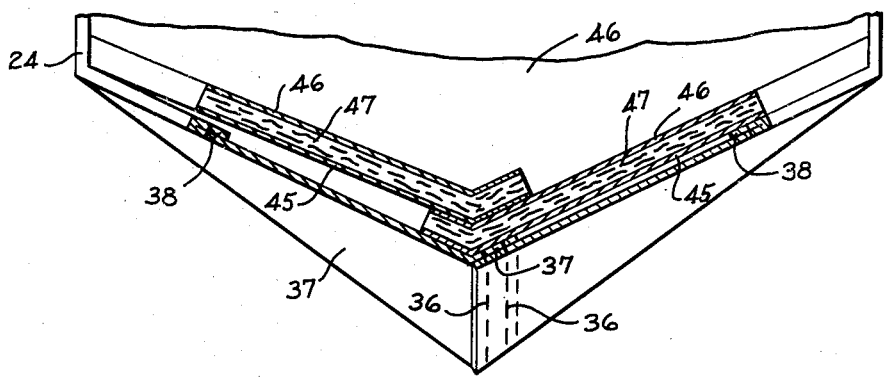

Oct. 19, 1965 E. GOLDSTEIN ETAL 3,212,501
URINE DRIP ABSORBING APPARATUS
Filed April 22, 1963 4 Sheets-Sheet 4

INVENTORS
EUGENE GOLDSTEIN
WILLIAM V. MATHENY
BY Alfred R. Fuchs
ATTORNEY

United States Patent Office 3,212,501
Patented Oct. 19, 1965

3,212,501
URINE DRIP ABSORBING APPARATUS
Eugene Goldstein, Kansas City, Mo., and William V. Matheny, Grafton, W. Va., assignors to H. G. Enterprises, Kansas City, Mo., a co-partnership
Filed Apr. 22, 1963, Ser. No. 274,501
2 Claims. (Cl. 128—295)

Our invention relates to urine drip absorbing apparatus, and more particularly to such an apparatus for use by males.

Our invention comprises a belt of elastic material adapted to be placed around the body of the wearer with the ends thereof in spaced relation and a shield of moisture repellent material mounted between the ends of the belt and extending downwardly therefrom, the lower end portion thereof forming a cup-shaped pouch, and being provided with means for mounting a pad thereon so as to be substantially coextensive therewith and with the lower end portion thereof seated in the cup-shaped pouch portion.

It is a purpose of our invention to provide an apparatus of the above referred to character, which is provided with leg strap means extending from the mid-portion of the pouch portion thereof adjacent the marginal edge thereof to the back of said belt on opposite sides of the middle thereof, which leg strap means is made up of a length of elastic material that is doubled on itself at its middle so as to have two portions thereof extending at an oblique angle to each other from the middle thereof, the doubled portion being stitched together to form an inextensible portion thereof for mounting one part of a fastening element thereon for detachably securing the leg strap structure to the pouch portion adjacent its marginal edge.

It is a further purpose of our invention to provide such an arrangement of the shield of moisture repellent material and the belt that the upper end portion of the moisture repellent shield acts as part of a body encircling member at the middle of the front portion thereof and to provide a pad that is of such a character that it may extend up to a point above the bottom edge of the belt in such a position that the moisture repellent material of the upper portion of the shield will be located between the belt and the pad to prevent moisture from being absorbed by the belt, should moisture pass upwardly to an extent to reach the upper edge portion of the pad.

It is a further purpose of our invention to provide a shield that has a pouch portion and is made entirely of washable material, the mounting of the shield and the pad being such that the wearer, if he desires, can remove the shield and pad and replace it on the shield with a new pad without removing the belt or undressing to make this change in pads.

It is a further purpose of our invention to provide an apparatus of the above referred to character that is provided with a pad that includes an outer ply of moisture repellent material which ply is adapted to be placed next to the shield, a ply of soft absorbent cloth, such as outing flannel, on the opposite face thereof and a filling of laminated moisture absorbent material between said outer plies, all said plies being secured together by stitching in the manner of a quilted member.

It is a further purpose of our invention to provide an apparatus of the above mentioned character in which a pad of the above mentioned character is used, which is detachably mounted on the shield or with which a disposable pad may be used, as may be found desirable.

It is another purpose of our invention to provide a pad of the above mentioned character, which has a main body portion that is co-extensive in width with the shield, said co-extensive in width portion extending to the top edge of said pad, and which has a pair of downwardly extending tapering portions at the lower end thereof that are adapted to be seated in the cup-like pouch portion of the shield with the adjacent edges of the tapering portions in overlapping relation so as to form a cupped portion at the lower end of said pad lying inside the cupped pouch portion of the shield.

Other objects and advantages of our invention will appear as the description of the drawings proceeds. We desire to have it understood, however, that we do not intend to limit the same to the details shown or described, except as defined by the claims.

In the drawings:

FIG. 6 is an enlarged fragmentary sectional view taken on the line 6—6 of FIG. 2, showing the pad that is shown in FIG. 4 applied thereto.

FIG. 7 is a view similar to FIG. 6, showing a disposable pad applied thereto.

FIG. 8 is an enlarged fragmentary face view of the pad.

FIG. 12 is an enlarged fragmentary sectional view taken on the line 12—12 of FIG. 3.

Referring in detail to the drawings, a belt 20 of elastic material is shown, which has ends 21 that are spaced from each other. Said ends are formed by doubled portions 22 of the belt secured together by means of stitching 23 to form a reinforced marginal portion at the opposite ends 21 of the belt.

Figure 1:
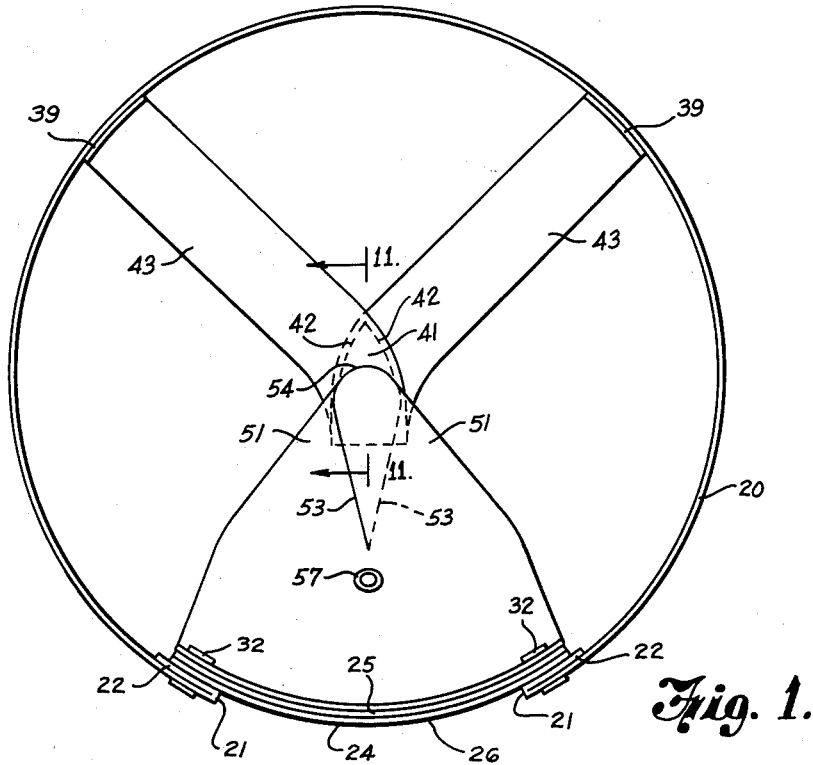
FIG. 1 is a top plan view of our improved drip catching apparatus completely assembled as it would be in position on the body of the wearer.
Figure 2:
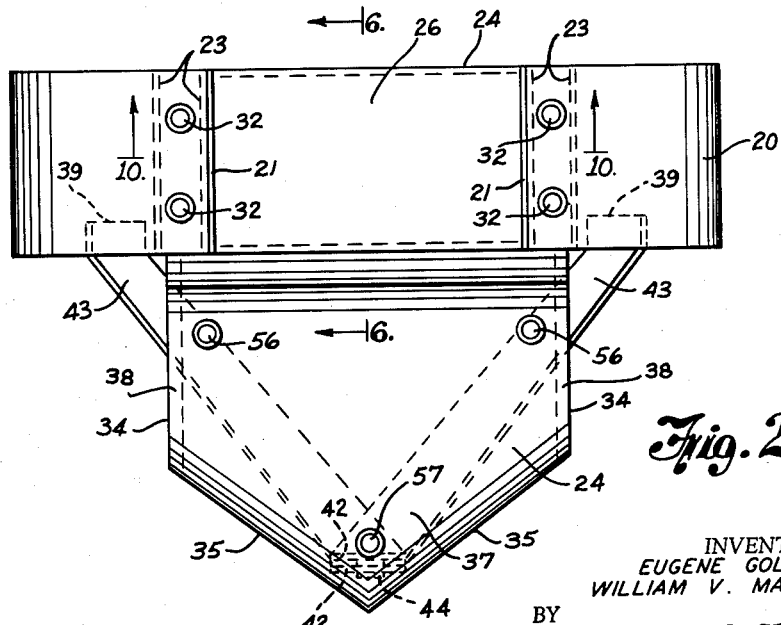
FIG. 2 is a front elevation thereof.
Figure 4:
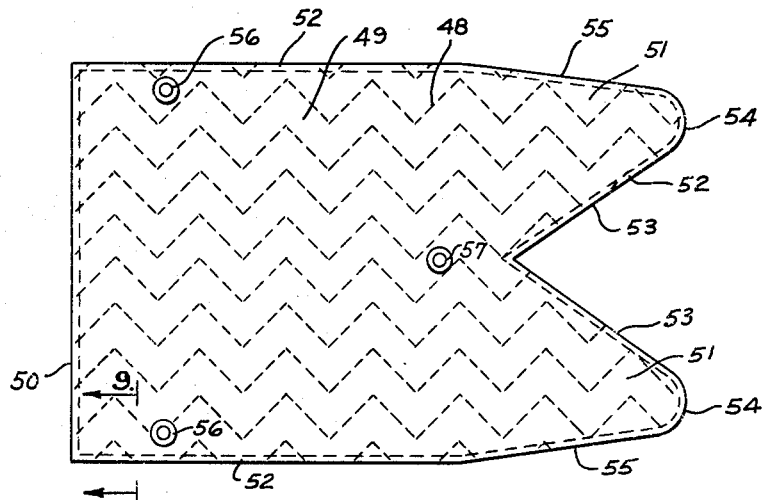
FIG. 4 is a plan view of the pad.
Figure 5:
FIG. 5 is an edge view of the pad.
Figure 10:
FIG. 10 is an enlarged fragmentary sectional view taken on the line 10—10 of FIG. 2.

Mounted so as to extend between the ends 21 of the belt 20 is a shield 24 of moisture repellent material, said shield having an upper end portion 25, which extends between the ends 21 of the belt 20 when in operative position. Said upper end portion 25 of said shield 24 is provided with a reinforcing ply 26 on the outer side thereof, the upper edge of the portion 25 and the upper edge of the reinforcing ply 26 being doubled back on themselves, as shown at 27 and 28, and secured together by stitching 29. The lower marginal edge of the reinforcing ply 26 is doubled back on itself as shown at 30 in FIG. 6 and is stitched to the portion 25, as shown at 31. Adjacent the vertical marginal edges of the ends 21 of the belt and the portions 25 of the shield 24 separable snap fasteners 32 are provided for securing the members 24 and 20 together in overlapping relationship, as shown in FIGS. 1, 2 and 10. The marginal side edges of the member 24 and the reinforcing ply 26 are also doubled back on themselves as indicated at 33 in FIG. 10 and secured to each other in a similar manner to that shown in FIG. 6.

The shield 24 has a main body portion of substantially uniform width extending downwardly from the top end thereof having substantially parallel side edges 34. The lower end portion of said shield 24 is, however, formed into a pouch by providing tapering lower end portions 35 on said shield, the adjacent edges of which are secured together by stitching 36, said edges being overlapped as shown at 37 to permit of such stitching of the same to each other (see FIG. 12). A cup-like pouch 37 is thus formed at the lower end portion of the shield 24. The side edges of said main body portion and said lower end portions are turned or doubled back on themselves and stitched down to provide reinforced marginal edge portions 38 on said member 24. It will be noted that said shield 24 is thus made entirely of moisture repellent sheet material.

Figure 3:
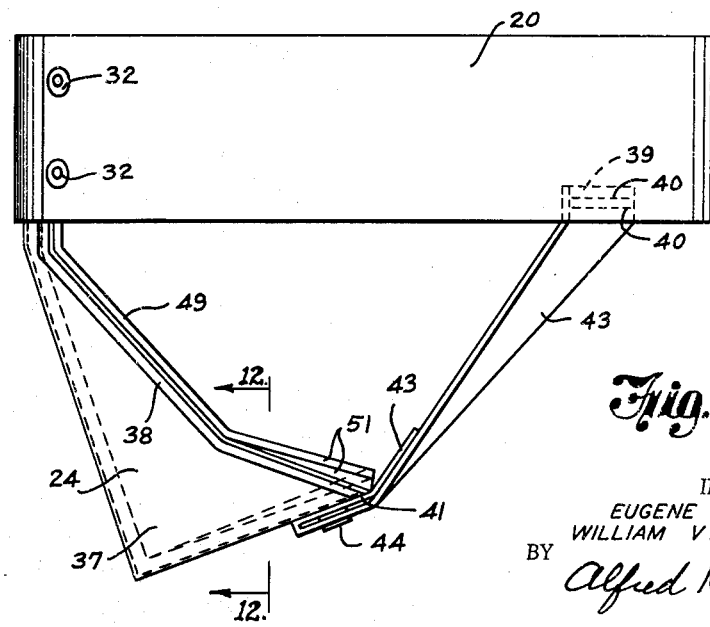
FIG. 3 is a side elevation thereof.

Leg strap means is provided, extending between the mid-portion of the cup-like pouch of the shield member 24 and the rear portion of the belt 20. Said leg strap means is preferably made of a single strap member of elastic material that has the ends 39 thereof secured in fixed position adjacent the lower marginal edge portion of the belt 20, as by the stitching shown at 40 in FIG. 3. The mid-portion of the leg strap means is doubled over on itself on an oblique angle as shown at 41 in FIGS. 2 and 11, the plies of the elastic leg strap material being secured together by means of stitching 42 so as to form an inextensible mid-area thereof from which the two diverging leg straps 43 extend. Mounted on said doubled over portion 41 is one of the paired portions of a separable element 44, the other portion of said fastening element being mounted on the shield member 24 adjacent the marginal edge of the pouch portion thereof at the middle of said pouch portion, a reinforcement being secured to said shield 24 for mounting the fastening element 44.

Detachably mounted on the shield 24 is a pad member, which is provided with an outer ply 45 of moisture repellent material on one side thereof and an outer ply 46 of absorbent fabric on the other side thereof. Mounted between the outer plies 45 and 46 is a filling 47 of laminated absorbent fibrous material. Said pad is provided with stitching 48 extending through the plies thereof securing said plies together, the pad thus being quilted. Said pad has a main body 49 that is of substantially the same width from the one end edge 50 thereof to the tapering end portions 51 thereof, and said main body portion 49 is of a width corresponding substantially to the width of the main body portion of the shield 24. The marginal portions of the pad are provided with stitching 52, reinforcing and closing the edges thereof, said stitching being shown more in detail in FIG. 8 and being preferably overcast so as to extend around the marginal edge of the pad.

The pad is provided with diverging edge portions 53 forming a V-shaped opening between the extensions 51, said tapering extensions 51 having rounded ends 54 and having inclined side edges 55. Separable fasteners 56 and 57 are provided for securing the pad in position on the shield 24, the separable fasteners 56 being mounted near the upper end portion of the pad adjacent the side margins thereof and the separable fasteners 57 being mounted in the middle of the shield member in the pouch forming portion thereof and upwardly spaced from and in alignment with the junction of the two diverging edge portions 53 of the tapering extensions 51.

When the apparatus is applied to the body the belt 20 is first placed around the waist of the wearer with the end portions 21 located on the forward side of the body of the wearer. The shield 24 is next put in place by attaching the same to the ends 21 of the belt by means of the separable fasteners 22. Next the leg straps 43 are attached to the shield 24 by means of the separable fastener 44. The shield 24 will now be depending from the belt 20 and will have the cup-shaped pouch portion located below the belt.

Figures 9, 11:
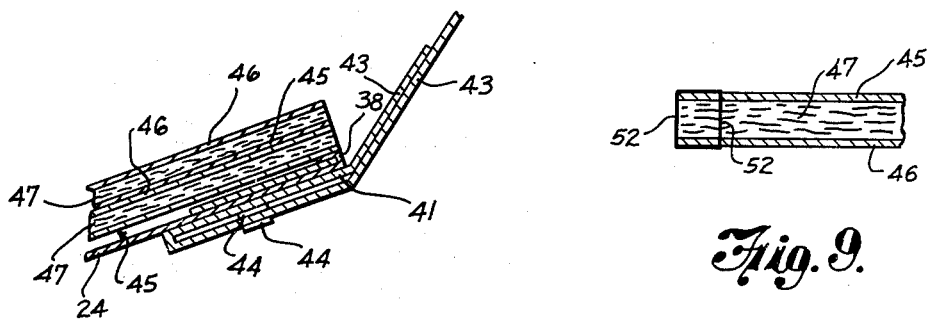
FIG. 9 is an enlarged fragmentary sectional view taken on the line 9—9 of FIG. 4.
FIG. 11 is an enlarged fragmentary sectional view taken on the line 11—11 of FIG. 1.

The pad is next inserted in position on the shield 24 with the side thereof having the outer ply 45 of moisture repellent material next to the shield 24, the same being properly located relative to the shield by engagement of the fasteners 56 on the shield and on the pad with each other. The lower end portion of the pad is then put into position by overlapping the edges 53 of the extensions 51 so that extensions 51 will fit in the lower cup-like pouch portion of the shield 24. This will cause the pad to assume a cup-like shape conforming to the shape of the lower end portion of the shield 24. The overlapped arrangement of the portions 51 of the pad is shown in FIGS. 1, 11 and 12, the two tapering ends having the rounded end portions thereof substantially coinciding when such overlap is obtained, as will be obvious from FIG. 1.

With the pad in this position, it will be lining the shield 24 completely from a point back of the lower edge of the reinforcing ply 26 at the upper end of the shield 24 to the extremity of the cup-shaped pouch portion, with the overlapped edges 53 of the tapering extensions 51 forming a seal to prevent escape of any moisture at this point. The moisture repellent facing 45 on the pad will be positioned adjacent the shield 24 while the absorbent fabric facing 46 will be toward the wearer so that any drops of urine discharged into the apparatus will pass through the facing 46 and be absorbed by the filling 47. It will be noted that even should moisture travel upwardly along the pad toward the upper marginal edge 50 thereof due to the wick-like action of the filling 47, it can not pass to the belt 20, which is of a character that it would absorb moisture, since it is made of an elastic fabric, because the upper end portion of the pad is held spaced from the ends 21 of the belt by the layer of moisture repellent material of the shield 24 interposed between the inner face of the belt 20 and the pad, the bridging portion 25 of the shield 24 being located between the belt 20 and said pad.

Because of the provision of the section of the moisture repellent material between the ends 21 of the belt, if desired, a disposable pad 58 of absorbent fibrous material can be mounted within the shield 24, as illustrated in FIG. 7. Said disposable pads are usually longer than the pad that is made up of the three plies previously described and has its top edge 59 extending upwardly above the bottom edge of the reinforced upper end portion of the shield. However, even with this type of pad, there will be no transfer of moisture from the pad 58 to the belt 20 because of the interposition of the upper end portion 25 of the shield 24 between the belt and the pad 58.

Figure 13:
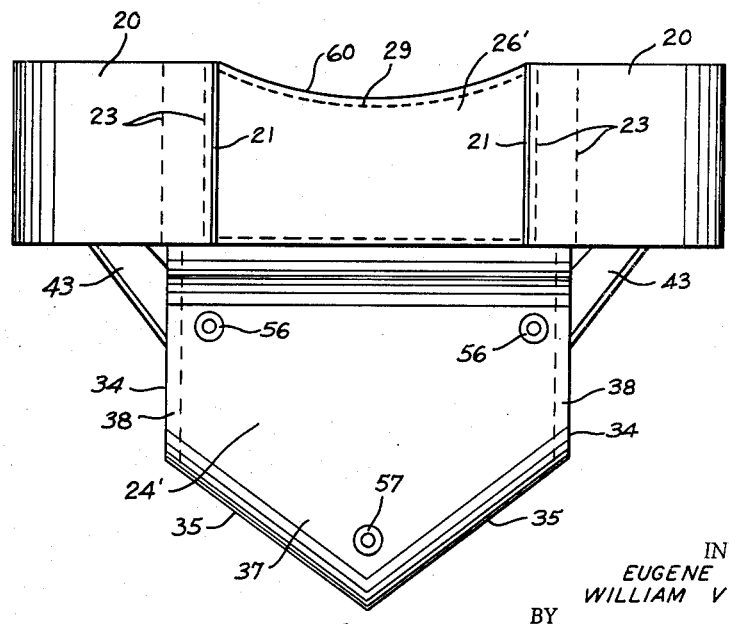
FIG. 13 is a front elevation of a modification.

It may be desirable to slightly modify the invention for use of the same by persons with a large abdominal bulge. FIG. 13 is a front elevation of such a modification. The belt is made in exactly the same manner as previously described and the shield indicated by the numeral 24' is made in the same manner as previously described except that the upper marginal edge portion of the same is concavely curved as shown at 60 in FIG. 13.

It is necessary that the shield and the pad mounted thereon be held closely to the body of the wearer. For this reason, if the wearer has a large abdomen and the top portion of the shield engages therewith, it will hold the shield too far away from the body. In order to have the belt mounted in the proper position on the body it is necessary under those circumstances to provide the concavely curved top edge 60.

The upper portion of the shield is provided with the reinforcing ply 26', which is mounted in the same manner on the upper portion of the shield as the reinforcing ply 26 in the previously described form of the invention, but is cut so as to have a concavely curved edge portion, the upper end portion of the main body of the shield 24' being also cut so as to be concavely curved so that when the upper end of the main body portion of the shield 24' and the reinforcing ply 26' are secured together by stitching 29 the concave top marginal edge 60 will be provided on the shield.

As the shield 24' is otherwise made exactly as the shield 24 and similarly associated with the pad and leg straps 43, the parts that are shown in FIG. 13 that correspond to the parts shown in the other form of the invention described are provided with the same reference numerals as in FIG. 2.

What we claim is:

1. Urine drip absorbing apparatus comprising a belt of elastic material adapted to be placed around the body of the wearer with the ends thereof in spaced relation to each other at the front of the body, a shield of moisture repellent material having a substantially flat rectangular main body portion and a pair of tapering lower end portions, said end portions being secured together at the adjacent marginal edges to form a cup-shaped pouch at the lower end of said body portion, and a reinforcing ply secured to said upper end portion of said main body portion to form a two-ply reinforced flat upper end portion thereon mounted between the ends of said belt and detachably connected with the ends of said belt in overlapping relation thereto and forming a continuation of said belt of substantially the width of said belt, whereby said upper end portion of said shield and said belt cooperate to encircle the body, elastic leg strap means providing a pair of leg strap portions extending at an oblique angle to each other fixedly secured to the rear portion of said belt at points on opposite sides of the middle thereof and detachably secured to said shield adjacent the marginal edge of said pouch midway thereof, and a pad member having a substantially rectagular main body portion of a width corresponding substantially to the width of the main body portion of said shield, and having a pair of tapering extensions at the lower end thereof adapted to be seated in said pouch with the adjacent edges thereof in overlapping relation to each other and means detachably securing said pad to said shield adjacent the upper end of said pad adjacent the side edges thereof and adjacent the junction of said tapering extensions with the upper continuous marginal edge of said pad located below the top edge of said shield back of said upper reinforced end portion thereof and said upper reinforced end portion of said shield interposed between the ends of said belt and said pad.

2. The urine drip absorbing apparatus claimed in claim 1 in which the absorbent pad comprising a ply of moisture repellent material, a ply of moisture absorbent fabric and a filling of laminated absorbent material between said repellant and absorbent plies is stitched to form a quilted pad.

References Cited by the Examiner

UNITED STATES PATENTS

| | | | |
|---|---|---|---|
| 857,019 | 6/07 | Berry | 128—289 |
| 1,614,180 | 1/27 | Bennet | 128—289 |
| 1,661,936 | 3/28 | Ferstl | 128—289 |
| 2,484,356 | 10/49 | Ribeiro et al. | 128—295 |
| 3,035,579 | 5/62 | Benovic | 128—295 |

RICHARD A. GAUDET, *Primary Examiner.*